(12) United States Patent
Gurvich et al.

(10) Patent No.: US 11,859,665 B2
(45) Date of Patent: Jan. 2, 2024

(54) DRIVE SHAFTS MADE OF COMPOSITE MATERIALS AND METHODS OF MAKING SUCH SHAFTS

(71) Applicant: Hamilton Sundstrand Corporation, Charlotte, NC (US)

(72) Inventors: Mark R. Gurvich, Middletown, CT (US); Brayton Reed, Rome, NY (US); Joyel M. Schaefer, Earlville, NY (US); Michael King, Sauquoit, NY (US); Kevin Thomas Gryk, Marcy, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1018 days.

(21) Appl. No.: 16/655,722

(22) Filed: Oct. 17, 2019

(65) Prior Publication Data
US 2021/0115965 A1     Apr. 22, 2021

(51) Int. Cl.
*F16C 3/02* (2006.01)
*B29C 70/74* (2006.01)
*B29L 31/00* (2006.01)

(52) U.S. Cl.
CPC ............. *F16C 3/026* (2013.01); *B29C 70/74* (2013.01); *B29L 2031/75* (2013.01)

(58) Field of Classification Search
CPC ....... F16C 3/026; B29C 70/74; B29L 2031/75
USPC ........................................................ 464/181
See application file for complete search history.

(56) References Cited

U.S. PATENT DOCUMENTS

| | | | |
|---|---|---|---|
| 4,248,062 A | 2/1981 | McLain et al. | |
| 4,695,340 A | 9/1987 | Matuska | |
| 4,838,833 A | 6/1989 | Coursin | |
| 4,895,551 A | 1/1990 | Fritz | |
| 5,785,431 A | 7/1998 | Nilsson et al. | |
| 6,210,283 B1 | 4/2001 | Wojciechowski et al. | |
| 6,820,654 B2 | 11/2004 | Lindsay | |
| 6,997,812 B2 * | 2/2006 | Sasaki | A01D 34/905 |
| 7,367,774 B2 | 5/2008 | Bourget et al. | |
| 8,984,940 B2 | 3/2015 | Josefczyk | |
| 10,004,960 B2 | 6/2018 | Shimono et al. | |
| 2015/0247454 A1 | 9/2015 | Laureano et al. | |
| 2016/0281767 A1 | 9/2016 | Mori | |
| 2019/0003522 A1 | 1/2019 | Bernard et al. | |

(Continued)

FOREIGN PATENT DOCUMENTS

| | | |
|---|---|---|
| CA | 1162408 A | 2/1984 |
| EP | 2412995 A1 | 2/2012 |
| EP | 3683461 A1 | 7/2020 |

(Continued)

OTHER PUBLICATIONS

NASA, Buckling of Thin-Walled Circular Cylinders, NASA Space Vehicle Design Criteria [Structures], NASA SP-8007, Sep. 1965, Revised Aug. 1968, pp. 1-60.

(Continued)

*Primary Examiner* — Greg Binda
(74) *Attorney, Agent, or Firm* — Carlson, Gaskey & Olds, P.C.

(57) ABSTRACT

A drive shaft has a tubular member extending between axial ends and being hollow. The tubular member is formed of a thermoplastic matrix with embedded fibers. At least one ring member is positioned radially of the tubular member. A method is also disclosed.

16 Claims, 12 Drawing Sheets

(56) References Cited

U.S. PATENT DOCUMENTS

2019/0128317 A1    5/2019    Giannakopoulos

FOREIGN PATENT DOCUMENTS

| EP | 3683462 A2 | 7/2020 |
| GB | 2406154 A | 3/2005 |
| JP | H1-229110 | 9/1989 |
| WO | 2016/180901 A1 | 11/2016 |

OTHER PUBLICATIONS

European Search Report for EP Application No. 19216567.8 dated May 26, 2020.
Partial European Search Report for EP Application No. 19210431.3 dated Jun. 9, 2020.
European Search Report for EP Application No. 19210431.3 dated Sep. 9, 2020.
Automated Dynamics, Automatic Fiber Placement, retrieved from http://www.automateddynamics.com/article/thermoplastic-composite-basics/processing-methods/automated-fiber-placement on Aug. 30, 2019.
Automated Dynamics, Tape Laying, retrieved from http://www.automateddynamics.com/automation-equipment/tape-laying on Oct. 17, 2019.
Definition of Automated fiber placement, retrieved from https://en.wikipedia.org/wiki/Automated_fiber_placement on Oct. 17, 2019.
Automated Tape Laying (ATP) / Automated Fiber Placement (AFP): CompositesWorld, retrieved from https://www.compositesworld.com/zones/automatic-tape-laying-and-fiber-placement on Oct. 17, 2019.

\* cited by examiner

DRIVE SHAFTS MADE OF COMPOSITE MATERIALS AND METHODS OF MAKING SUCH SHAFTS

BACKGROUND

This application relates to drive shafts and methods of making drive shafts.

Drive shafts are utilized in any number of applications. Typically, a drive shaft connects a source of drive to an item to be driven. Drive shafts are utilized in aerospace applications. One particular application is to drive tail rotors as associated with a helicopter.

Such drive shafts may convey a good deal of torque and, thus, are subject to torsional stresses.

Drive shafts have historically been formed of metal. More recently, it has been proposed to utilize composite materials to form drive shafts.

Due to strength efficiency of composite materials per weight, composite drive shafts can be relatively thin-walled, making them sensitive to local instability (buckling) under service load conditions. To mitigate this risk, design enhancements to composite drive shafts are proposed, along with corresponding methods of making. These enhancements are specifically proposed for drive shafts made of thermoplastic matrix with embedded fibers and allowing to use fabrication advantages of automated fiber placement (AFP) and/or automated tape laying (ATL).

SUMMARY

A drive shaft has a tubular member extending between axial ends and being hollow. The tubular member is formed of a thermoplastic matrix with embedded fibers. At least one ring member is positioned radially of the tubular member.

A method is also disclosed.

These and other features may be best understood from the following drawings and specification.

DETAILED DESCRIPTION

Figure 1:
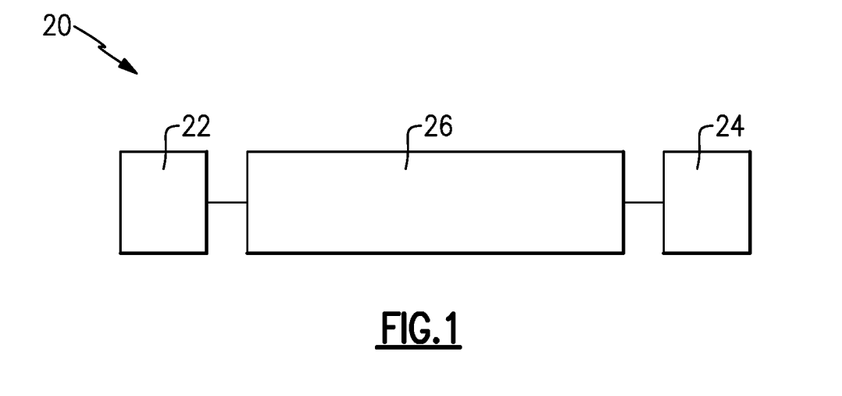
FIG. 1 schematically shows a drive shaft application.

FIG. 1 shows a drive arrangement 20, which drives a component 22 through a drive input 24. A drive shaft 26 connects the input 24 to the output 22. As one example, component 22 may be helicopter propellers.

The drive shaft 26 may be formed of composite materials. Drive shafts 26 coming within the scope of this disclosure may be formed of fiber reinforced polymer matrix composite materials. In particular, the matrix can be a thermoplastic polymer. Different types of reinforcing fibers, such as, for example, carbon fibers, glass fibers, organic fibers, inorganic materials (e.g., ceramic) fibers, or their combinations can be used in different embodiments. In addition, while thermoplastic polymers are preferred, thermoset polymers may benefit from some of the structural details disclosed below.

Figure 2A:
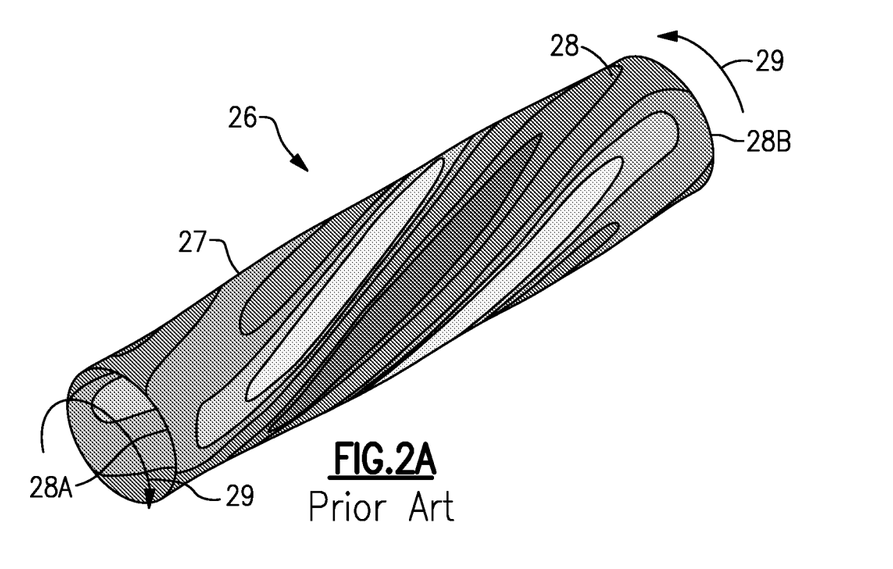
FIG. 2A shows a challenge in the prior art.

FIG. 2A shows a concern with a known shaft 26 during operation. Shaft 26 extends between ends 28a and 28b. There are "wrinkles" 28 that may be formed along the length of the shaft 26 due to local instability (buckling) from the torque moment 29 transmitted through the drive shaft 26. These wrinkles are shown in FIG. 2A as an example of shear stress distribution, calculated by finite element method for a representative thin-walled composite drive shaft.

Figure 2B:
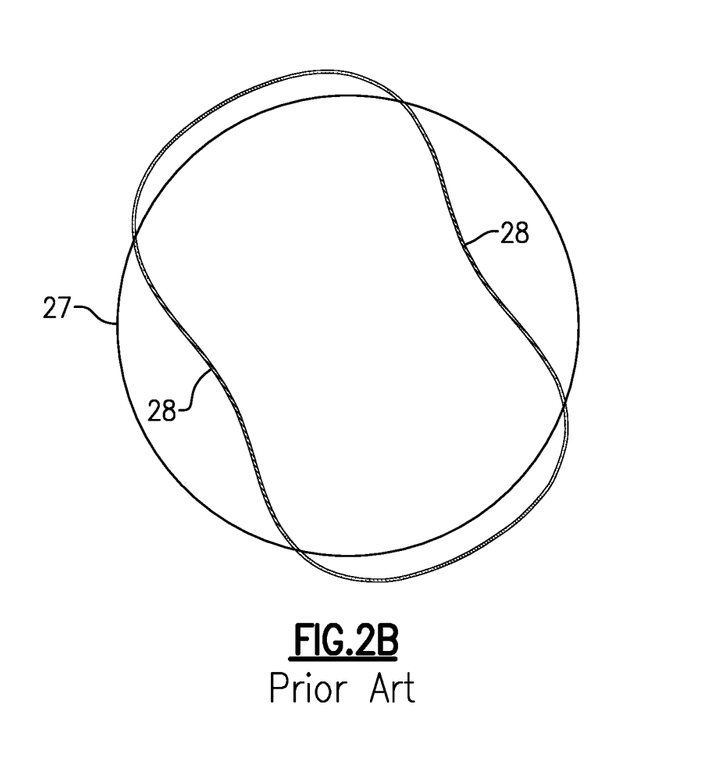
FIG. 2B shows the result of the prior art challenge.

FIG. 2B illustrates a diametric cross-section in the center of a composite drive shaft shown in FIG. 2A before and after the event of local buckling. As shown in FIG. 2B, the wrinkles 28 can move the shaft 26 from its original cylindrical shape 27 such that it has cross-sectional deformation at 28.

FIGS. 3-6 below show axial cross-sections of designs of composite drive shafts. FIG. 3A shows known shaft 26 having a uniform outer and inner surfaces.

Figure 3A:
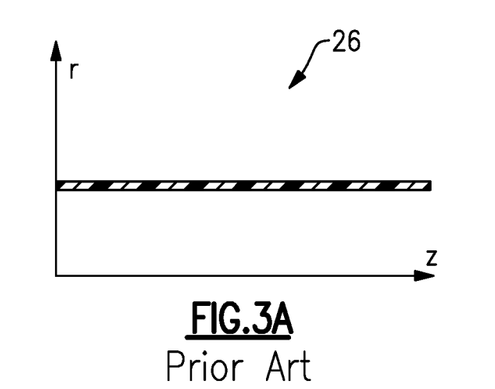
FIG. 3A shows a prior art shaft.
Figure 3B:
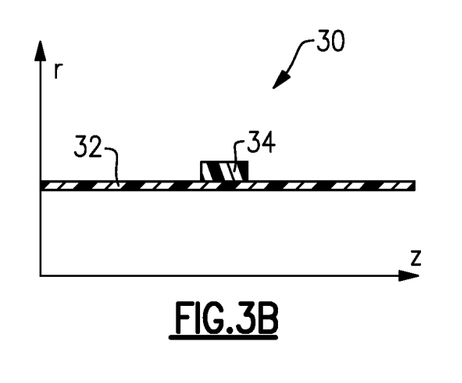
FIG. 3B shows a first embodiment drive shaft.

FIG. 3B shows a first embodiment 30 wherein the drive shaft has a nominal hollow tubular member 32 with a ring member 34 adhered to the outer periphery. The member ring 34 will resist the local buckling deformation under torsional moment, if bending stiffness of the ring member is sufficiently high. The bending stiffness of the ring member in the hoop direction is preferably, at least twice as high as the bending stiffness of a tubular member wall segment with the same width as the ring.

Figure 3C:
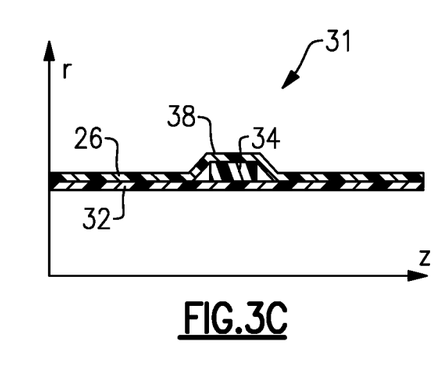
FIG. 3C shows another embodiment drive shaft.

FIG. 3C shows an embodiment 31, which is similar to embodiment 30 except the ring member 34 is between an inner wall, tubular member 32 and an outer wall 36. A ramp or bump 38 is formed in the outer wall 36 to enclose the ring member 34.

Figure 3D:
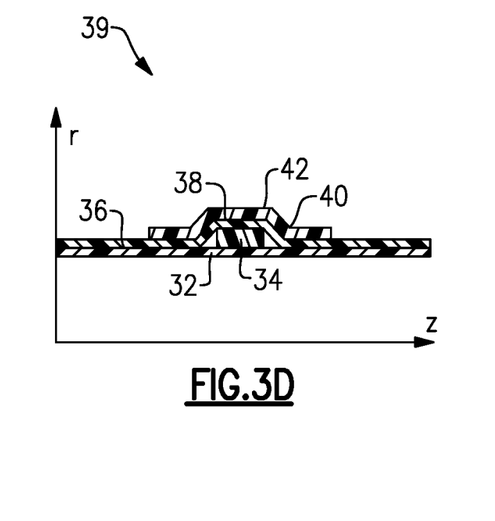
FIG. 3D shows yet another embodiment drive shaft.

FIG. 3D shows yet another embodiment 39, similar to embodiment 31, but wherein there is an extra wrap 40 having a bump 42 at the location of the bump 38. The wrap 40 can minimize risk of debonding between the ring member 34 and outer wall 36. Also, the wraps may help secure the ring 34 to the underlying tubular member 32. Further, the wraps can provide better adherence. In addition, by selecting materials for the wraps, any number of other features or characteristics can be placed into the tubes.

Figure 3E:
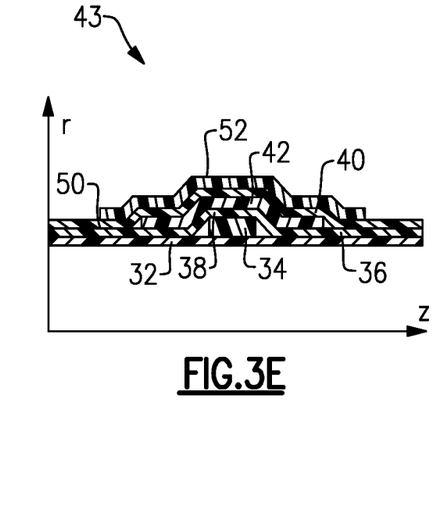
FIG. 3E shows yet another embodiment drive shaft.

FIG. 3E shows an embodiment 43 similar to the embodiment 39, however, additional wraps 50 and 52 are placed outwardly of the wrap 40. FIG. 3E illustrates a case with three wraps, however, different number of the wraps can be used according to specifics of designs, applications and load conditions.

Figure 3F:
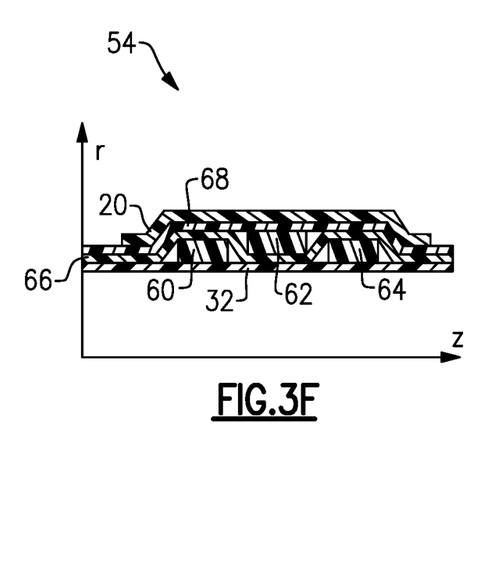
FIG. 3F shows yet another embodiment drive shaft.

FIG. 3F shows an embodiment 54 having an underlying tubular member 32 with ring members 60 and 64. An outer wrap 66 is placed outwardly of ring members 60 and 64. Another ring member 62 is placed axially intermediate ring members 60 and 64, and radially intermediate the wrap 66 and an outer wrap 68. Another wrap 70 is placed outwardly of the wrap 68. Similarly to FIG. 3E, different number of wraps and unconnected individual rings can be used according to the specifics of requirements.

Figure 4A:
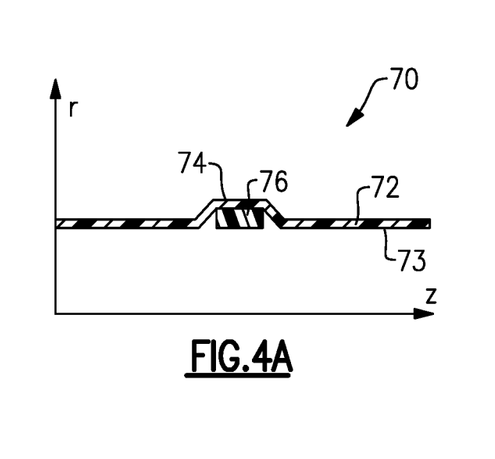
FIG. 4A shows yet another embodiment drive shaft.

FIG. 4A shows an embodiment 70 wherein the ring member 76 is on an inner surface 73 of the tubular member 72. The tube 72 has an outwardly extending bump 74 to accommodate ring 76.

Figure 4B:
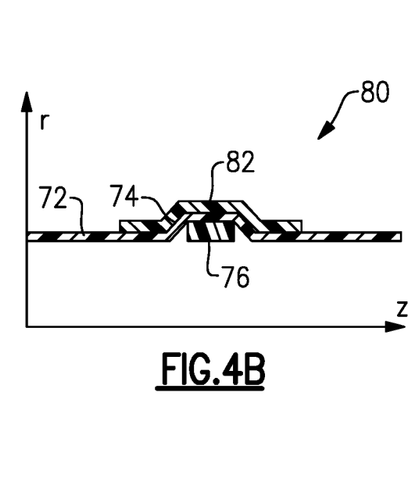
FIG. 4B shows yet another embodiment drive shaft.

FIG. 4B shows an embodiment 80, which is similar to embodiment 70, however, an additional wrap 82 is placed outward of the bump 74.

Figure 4C:
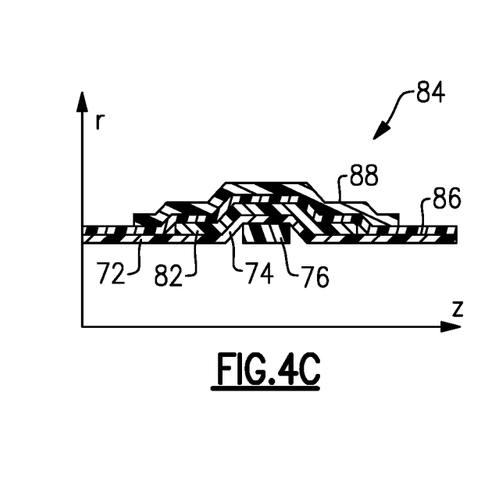
FIG. 4C shows yet another embodiment drive shaft.

FIG. 4C shows an embodiment 84. Here, additional wraps 86 and 88 are added to the embodiment 80. In other embodiments, different number of wraps can also be used.

Figure 4D:
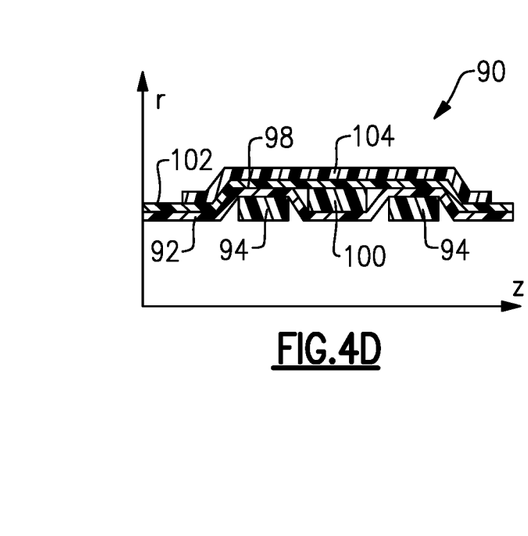
FIG. 4D shows yet another embodiment drive shaft.

FIG. 4D shows an embodiment 90. Here, two ring members 94 are axially spaced at a radially inner surface of an inner shaft 92. Another ring member 100 is placed axially intermediate ring members 94, and radially intermediate inner shaft 92 and an outer shaft 102. Another wrap 104 is placed radially outward of the wrap 102. In other embodiments, different number of wraps and/or individual unconnected rings can also be used.

Figure 5A:
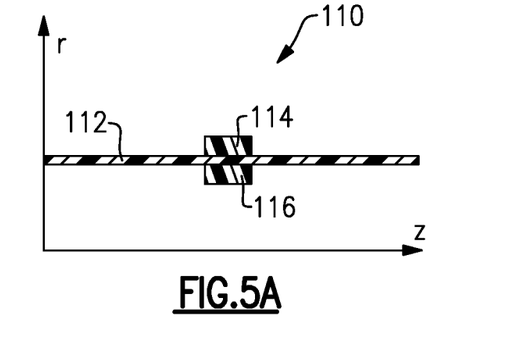
FIG. 5A shows yet another embodiment drive shaft.

FIG. 5A shows an embodiment 110 wherein ring members 114 and 116 are placed both radially outwardly and radially inwardly of the tube 112.

Figure 5B:
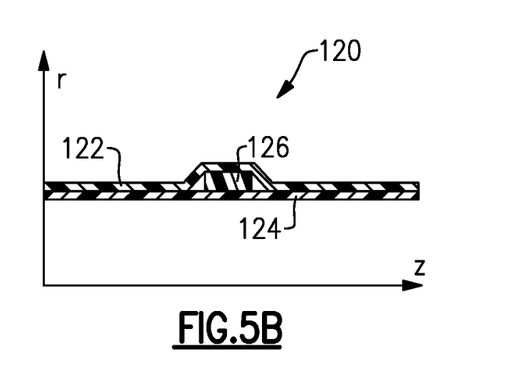
FIG. 5B shows yet another embodiment drive shaft.

FIG. 5B shows an embodiment 120 similar to FIG. 3C, having an outer ring 122 outward of the ring 126 and an inner ring 124.

The rings illustrated so far have been generally rectangular, or close to rectangular, in cross-section. Here "generally rectangular" shapes also include similar shapes with upper and lower surfaces of the ring parallel or almost parallel to each other with curved shapes at other side surfaces (e.g., corners at the left and right at FIGS. 3-5).

Figure 6A:
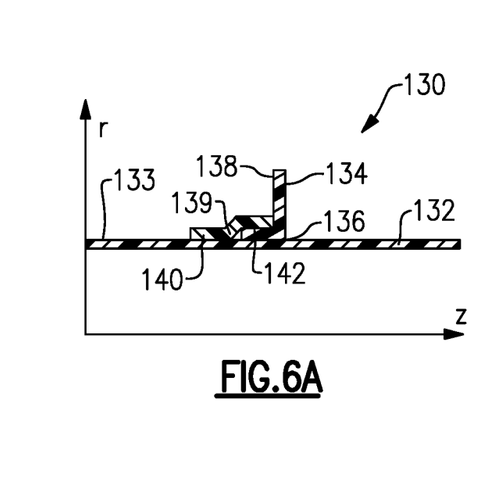
FIG. 6A shows yet another embodiment drive shaft.

FIG. 6A shows an embodiment 130 wherein the tube 132 has an L-shaped (in cross-section) ring member 134. L-shaped ring member 134 is defined as having an axially extending contact portion 136, in contact with the outer periphery 133 of the tube 132. Radially outwardly extending ring 138 extends radially outwardly from the portion 136. An optional wrap 137 has a portion 140 secured to the outer surface 133 and a portion 142 radially outward of the portion 136 of the ring 134.

Figure 6B:
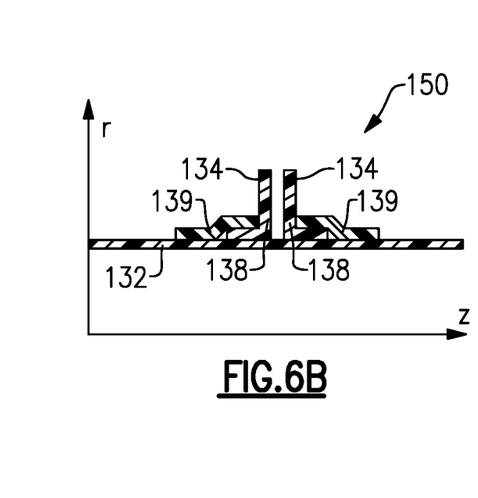
FIG. 6B shows yet another embodiment drive shaft.

FIG. 6B shows an embodiment 150 having a pair of L-shaped ring members 134 having the radially outwardly extending surfaces 138 facing each other. Both can be provided with optional wraps 139.

Figure 6C:
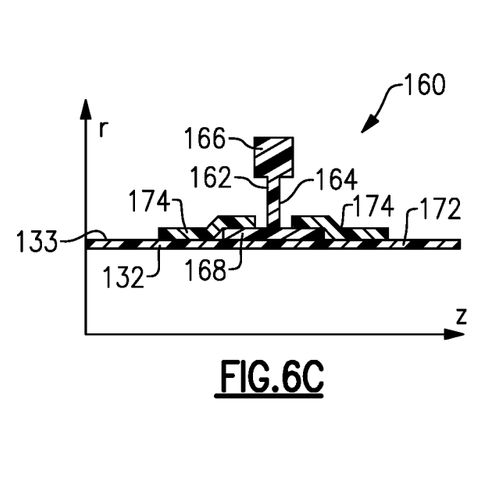
FIG. 6C shows yet another embodiment drive shaft.
Figure 6D:
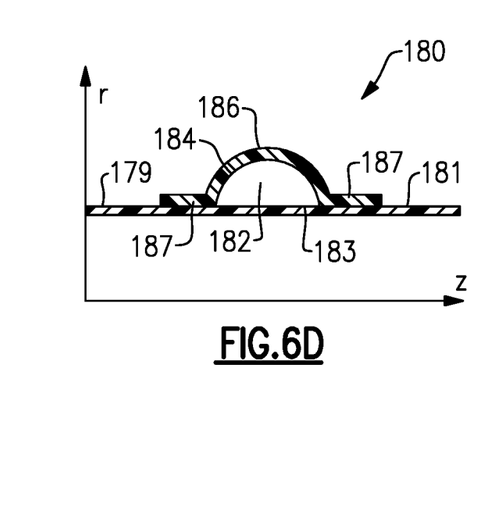
FIG. 6D shows yet another embodiment drive shaft.

FIG. 6C shows an embodiment wherein the ring member 162 has an I-shape (in cross-section) with a contacting portion 168 in contact with the outer periphery 133 of the inner shaft 132. A radially outwardly extending portion 164 extends to a radially outward thicker portion 166. Optional wraps 174 are secured on each axial end of the portion 164 and to the contact portion 168. L- and I-shaped rings can have advantages in providing higher bending stiffness per weight in comparison, for example, with rings with rectangular cross-sections. FIG. 6D shows a ring 182 having an outer periphery 184 that has a part circular or similar curved convex shape in the cross-section. A contact portion 183 is in contact with an outer surface 179 of the tube 181. An outer optional wrap 186 is also secured at ends 187 to the outer surface 179 and to the ring 182.

Figure 6E:
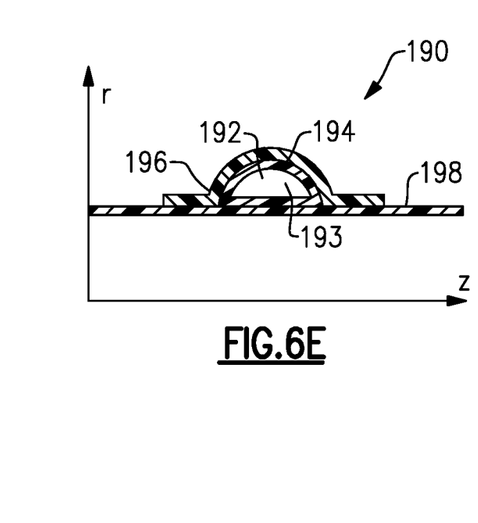
FIG. 6E shows yet another embodiment drive shaft.

FIG. 6E shows an embodiment 190 wherein the ring member 192 has a pair of different material portions 193 and 194. Similarly, rings with more than two materials can be used in other embodiments. Again, a ring member 196 may be spaced on an opposed side of the tube 194 from the ring 192. The materials may be selected to achieve particular benefits.

Figure 6F:
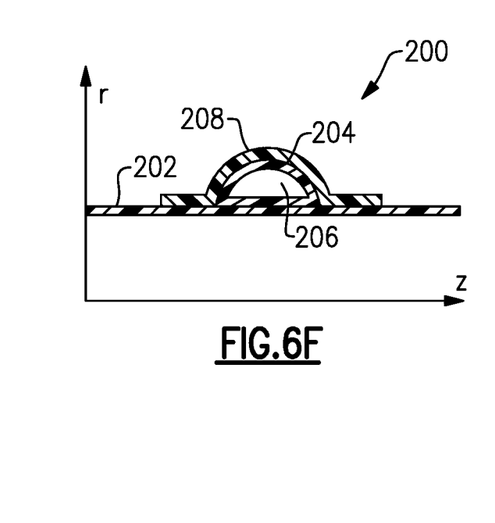
FIG. 6F shows yet another embodiment drive shaft.

FIG. 6F shows an embodiment 200 wherein the tube 202 receives a ring member 204 that has a hollow 206. The hollow 206 may also be filled by various materials, or may be left empty. An optional wrap 208 may also be secured outwardly of the ring 204.

Figure 7A:
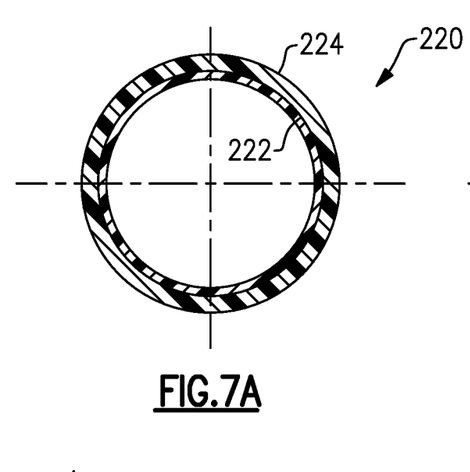
FIG. 7A shows a detail of the previous embodiments.

FIG. 7A shows the embodiments 220 such as has been illustrated to this point and having a tubular member 222 with a ring member 224 extending about the entire circumference.

Figure 7B:
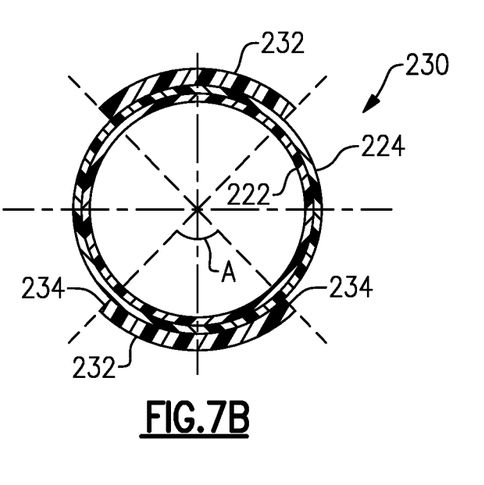
FIG. 7B shows yet another embodiment.

FIG. 7B shows embodiment 230 wherein the tube 222 may receive a ring member 224 extending across the entire circumference, but may also receive isolated ring portions 232 extending between circumferential ends 234 extending through an angle A. In this embodiment, angle A may be 90°. Further, the ring portions 232 may be utilized without the full hoop ring 224 in some embodiments.

Figure 7C:
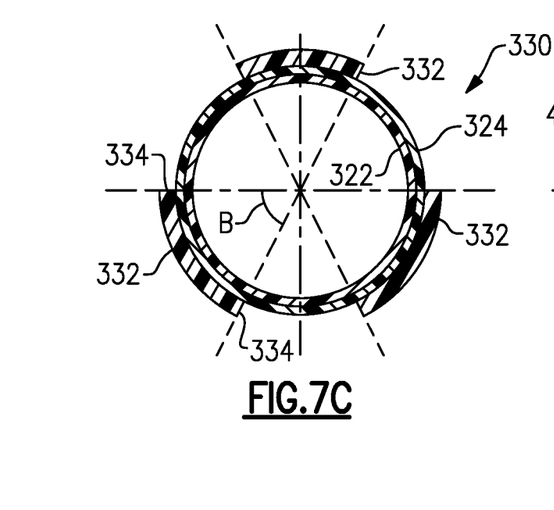
FIG. 7C shows yet another embodiment.

FIG. 7C shows an embodiment 330 wherein the tube 322 and the full hoop ring member 324 receive ring portions 332 extending between circumferential ends 334. Here, circumferential ends 334 extend through an angle B. In one embodiment, angle B is 60°.

Figure 7D:
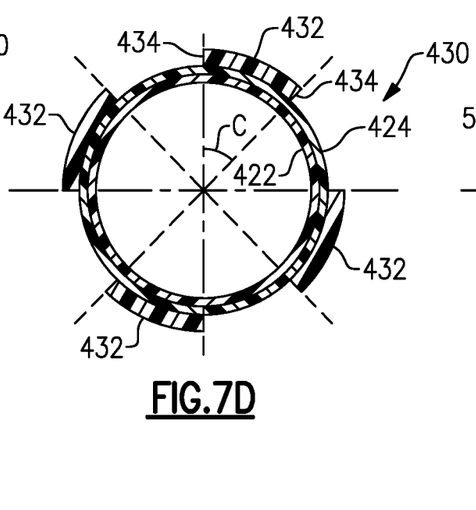
FIG. 7D shows yet another embodiment.

FIG. 7D shows an embodiment 430 wherein the tubular member 422 has the ring member 424 and the ring portions 432. Ring portions 432 extend between ends 434. Ends 434 extend through a circumferential extent of an angle C. In embodiments, angle C is 45°.

Figure 7E:
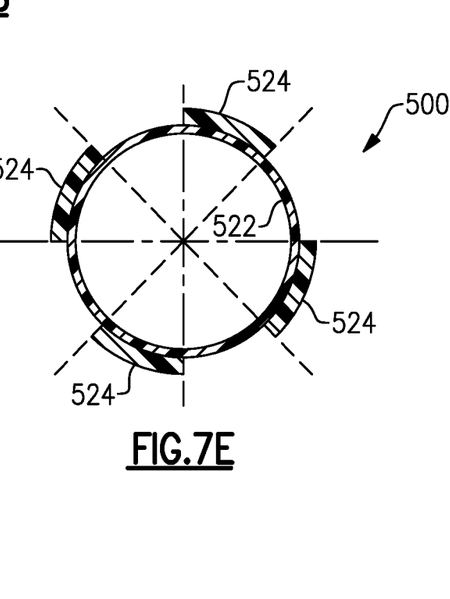
FIG. 7E shows yet another embodiment.

FIG. 7E shows an embodiment 500 wherein a tubular member 522 does not receive a full hoop ring. Rather, only the circumferentially spaced ring portions 524 are utilized. While the embodiment 500 resembles FIG. 7D and its spacing, it should be understood that the other ring portions of FIGS. 7B and 7C can be utilized without the underlying full hoop structure. The number and sizes of ring portions can be different in other embodiments and can be defined by design optimization driven, for example, by criteria of weight reduction.

Figure 8:
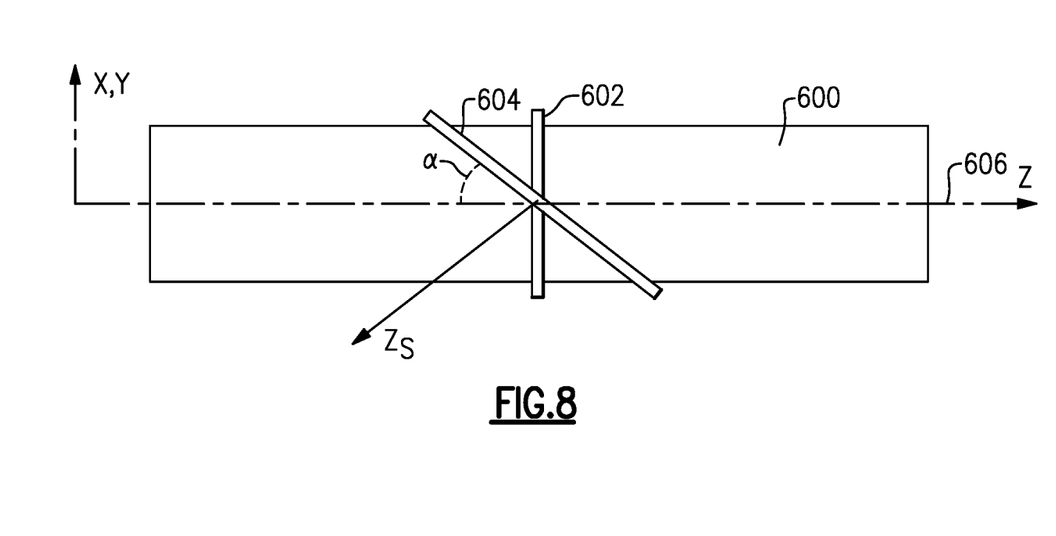
FIG. 8 shows yet another embodiment.

FIG. 8 shows a feature with regard to a tubular member 600 having a center axis 606. The ring member 602 may be formed to be perpendicular relative to the axis 606. On the other hand, a ring 604 may extend at an angle such that it is not perpendicular to the axis 606. The angle α here may be selected to provide various functions to optimize the drive shaft design for specific loading conditions. For example, one may account for bending and axial load components in addition to the torque. Angle α can be either uniform or non-uniform along the ring length.

Figure 9A:
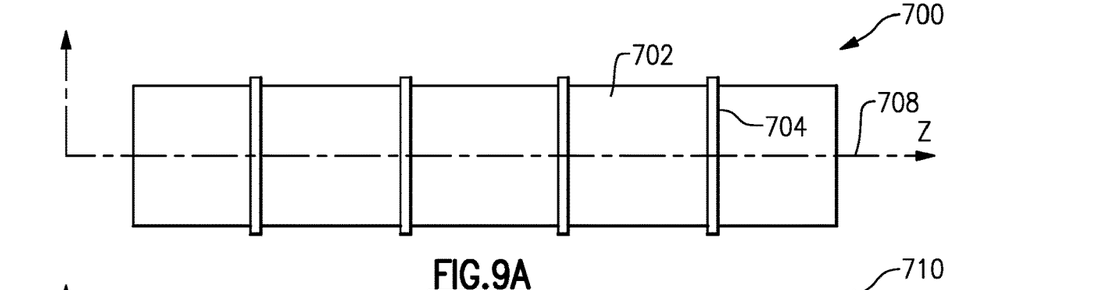
FIG. 9A shows yet another embodiment.

FIG. 9A shows an example 700 wherein tubular member 702 receives a plurality of ring members 704, which are all perpendicular to the axis 708.

Figure 9B:
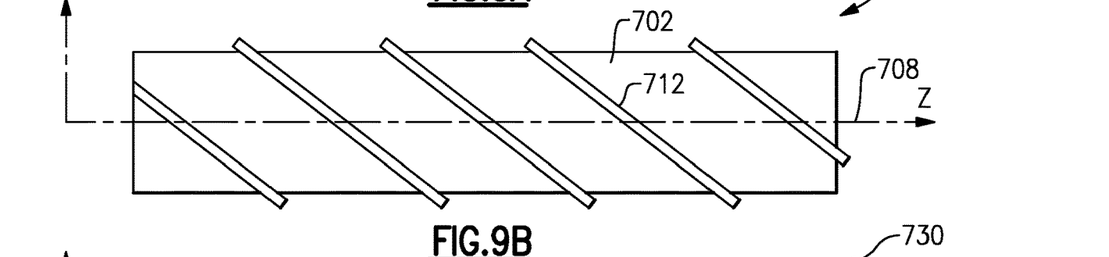
FIG. 9B shows yet another embodiment.

FIG. 9B shows an embodiment 710 wherein the tubular member 702 receives a plurality of ring members 712, which are all formed at a slope, such as shown in 604 in FIG. 8.

Figure 9C:
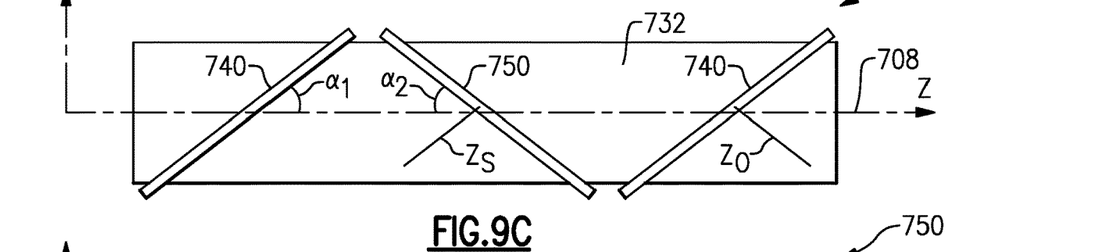
FIG. 9C shows yet another embodiment.

FIG. 9C shows an embodiment 730 wherein the tubular member 732 receives ring members 740 at a slope relative to the axis 708 and other ring members 750 extending in an opposed angle relative to the angle $\alpha_1$ that the ring members 740 are sloped relative to axis 708. The angle $\alpha_2$ that the ring members 750 are sloped with regard to the axis 708 may be equal to, but in an opposed direction from the angle E.

At least one of the plurality of ring members could be said as having a central axis $Z_s$ which is non-perpendicular to a central axis 708 of the tubular member 732. At least one of the central axis $Z_o$ of at least one of the plurality of ring members extends in an opposed direction relative to the central axis $Z_s$ of at least another of the plurality of the rings.

Figure 9D:
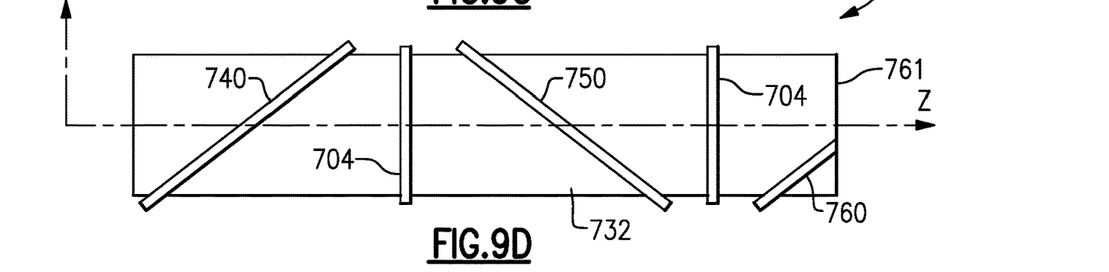
FIG. 9D shows yet another embodiment.

FIG. 9D shows an embodiment 750 wherein the underlying tubular member 732 receives angled ring members 740 and 750, extending in opposed directions, and perpendicularly positioned ring members 704. In addition, a ring portion 760 is formed only at an end 761.

Figure 9E:
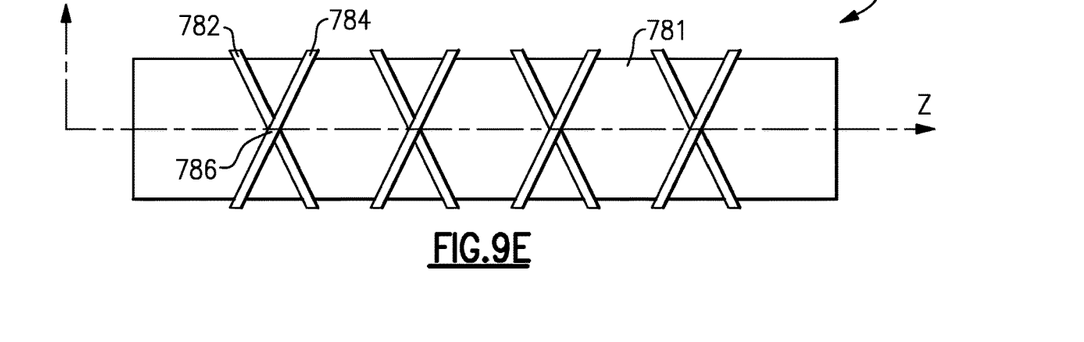
FIG. 9E shows yet another embodiment.

FIG. 9E shows an embodiment 780 wherein a tubular member 781 has ring members 782 and 784 extending at a slope, but in opposed directions, similar to the FIG. 9C or FIG. 9D embodiments. However, the ring members 782 and 784 also intersect at points 786. Opposite directions of ring members 782 and 784 can be the same or different. Different angles of ring members 782 and 784 can be especially helpful in case of dominant torque in one direction.

The ring members extending at a single slope, such as shown in FIG. 9B, might be especially helpful if torque is primarily applied in one direction. On the other hand, the embodiment of FIG. 9C may be helpful if there is rotation passing in both directions through the shaft.

With regard to the sloped ring members, it could be said that they extend at an angle relative to a central axis of the tubular member such that the outer peripheral surface of the ring members lies at different axial positions on an outer periphery of the tubular member measured along the central axis 708.

Figure 10:
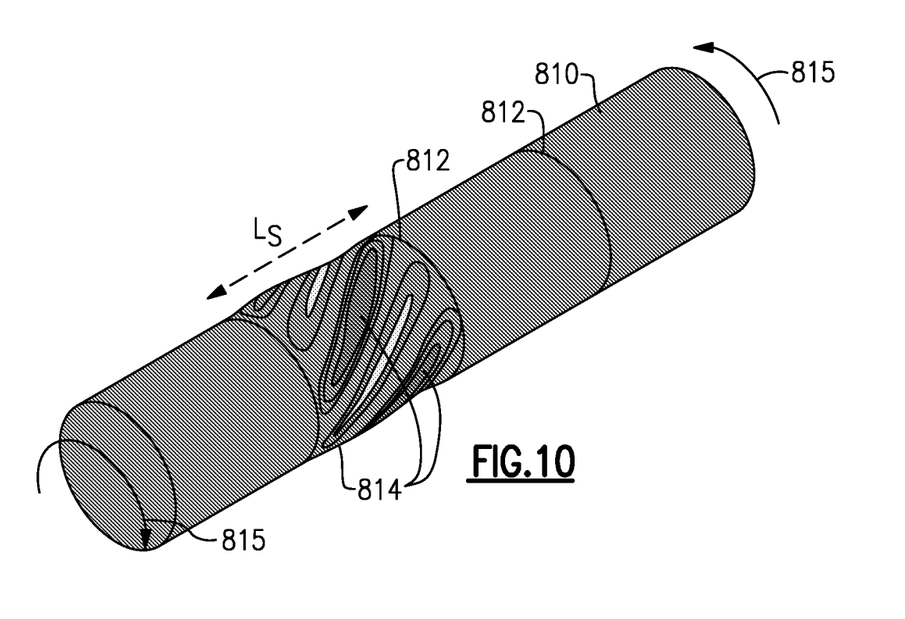
FIG. 10 is a view similar to that shown in FIG. 2A, but showing the effect of the disclosed embodiments.

FIG. 10 shows a feature of the disclosed shafts. A tubular member 810 has ring members 812 spaced along an axial dimension. There will still be deformation at 814 under torque 815, such as the "wrinkle" mentioned with regard to FIG. 2A. However, as can be appreciated, by shortening the length $L_S$ through which the deformation 814 extends, the magnitude of the deformation will also be reduced. Here, the wrinkles are shown as distributions of shear stresses calculated by the finite element method for a problem similar to one shown at FIG. 2 but with added rigid rings.

Figure 11A:
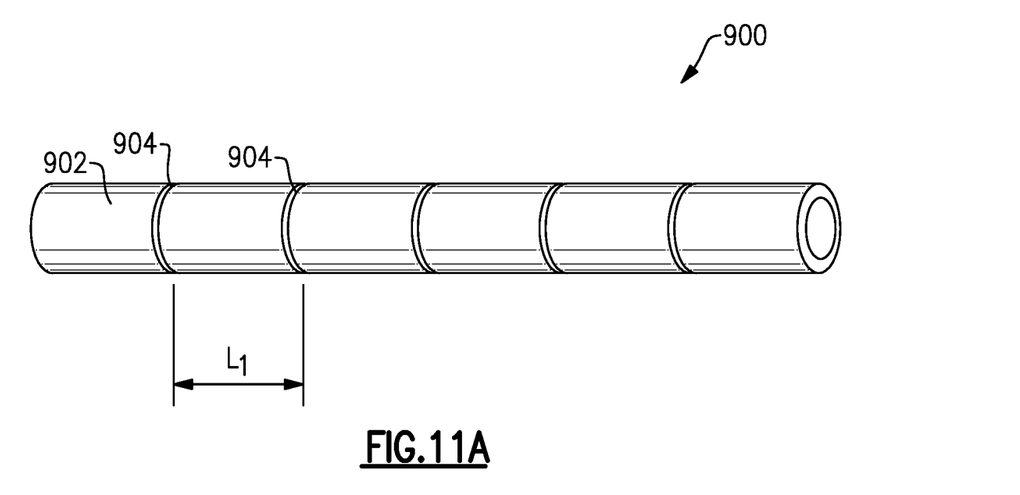
FIG. 11A is yet another embodiment.

FIG. 11A shows a feature 900 wherein the tubular member 902 has a plurality of equally spaced ring member 904. The ring member 904 in FIG. 11A are spaced by an axial distance $L_1$.

Figure 11B:
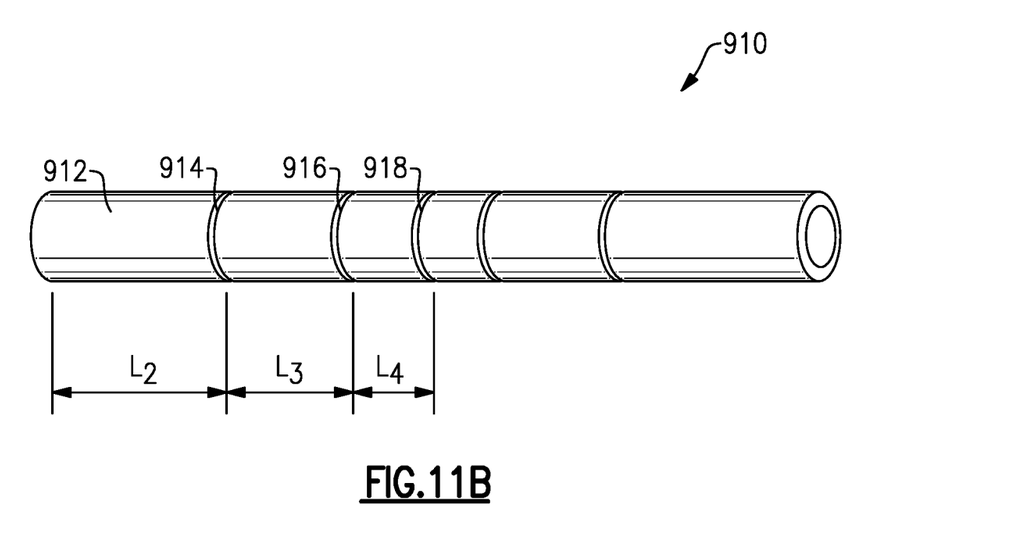
FIG. 11B is yet another embodiment.

FIG. 11B shows an embodiment 910 wherein a tubular member 912 receives ring members 914, 916, and 918. The ring members in the embodiment 910 are spaced by axial distances $L_2$, $L_3$, and $L_4$. As can be appreciated, $L_2$-$L_4$ are not all the same length.

The lengths can be selected based upon an understanding that a buckling moment is approximately inversely proportional to the square root of the length L.

A formula is shown below which will help select lengths L for a tube having a radius R.

$$MT = \sim 21.75*(D_{\Theta\Theta}{}^\wedge(5/8))*(E_{xx}{}^\wedge(3/8))*(RA(5/4))/(L^\wedge(1/2))$$

Here $D_{\Theta\Theta}$ is the bending stiffness of the drive shaft wall in the hoop direction, and $E_{xx}$ is the axial stiffness of the wall, respectively.

Figure 12A:
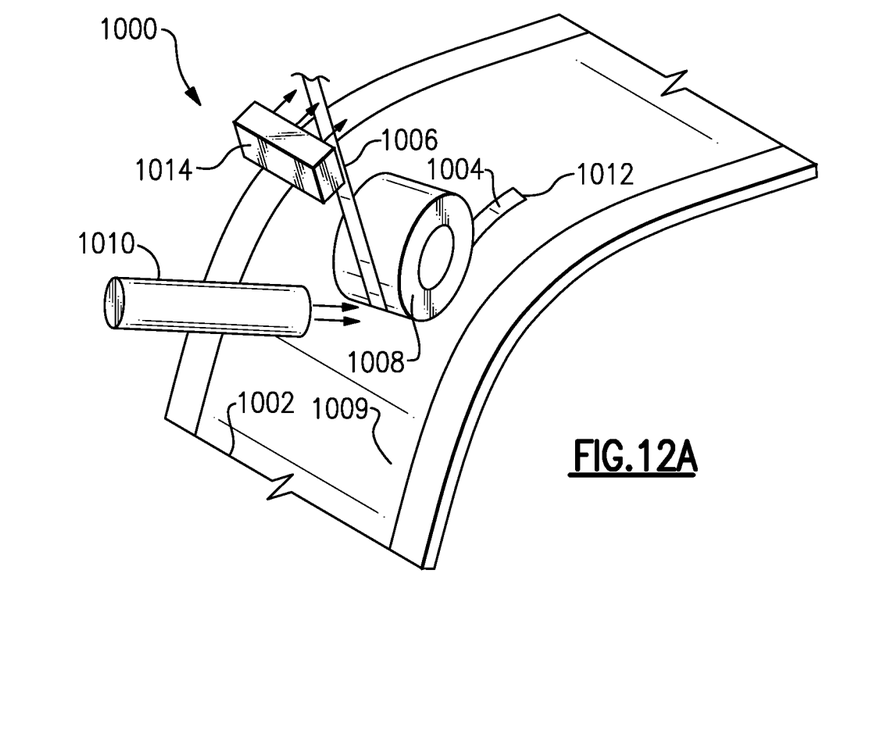
FIG. 12A is a view of a manufacturing step.

A method of attaching ring member using the Automated Fiber Placing (AFP) method is shown at 1000 in FIG. 12A. A tubular member 1002 is shown receiving a material 1004. The material 1004 comes from a source, with a feed mechanism. A consolidation roller 1008 is rolling the material 1004 on an outer peripheral surface 1009. A heater 1010 is providing heat to the material to cause it to deform and adhere to the outer surface 1009. A beginning point 1012 of the material 1004 is shown. If a full ring is utilized, once the material 1006 reaches the end 1020, a cutter 1014 cuts the material. Of course, in the embodiments having partial ring portions, the cutting would occur at the appropriate ends.

Figure 12B:
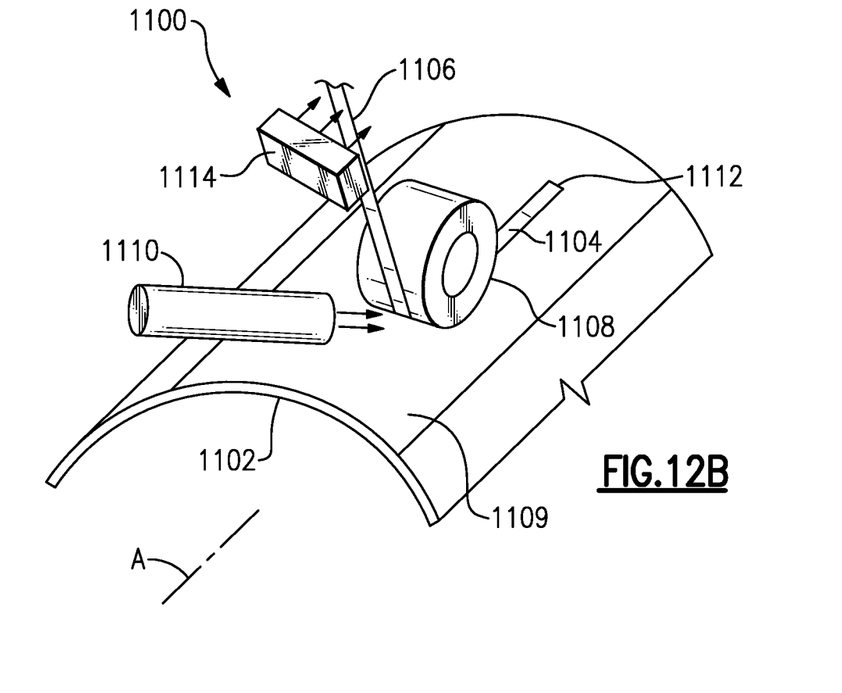
FIG. 12B is a view of a manufacturing step.

FIG. 12B shows an embodiment 1100 showing a method similar to that of FIG. 12A. Common features are indicated by reference numerals 100 larger than those shown in FIG. 12A. However, the material 1104 is placed in an axial direction along an axis A of the tubular member 1102 or any other directions in addition to the axial and hoop directions. The embodiment shown in FIG. 12B can be used to fabricate rings in non-circumferential directions (e.g., shown in FIGS. 9B-9E) and/or to fabricate bodies of composite shafts with multi-directional laminated layups.

The method shown in FIGS. 12A and 12B is generally known as automated fiber placement (AFP) or automated tape laying (ATL).

A drive shaft according to this disclosure could be said to include a tubular member extending between axial ends and being hollow. The tubular member is formed of a thermoplastic matrix with embedded fibers. There is at least one ring member positioned radially of the tubular member.

The "positioned radially" language should be understood to cover on an outer peripheral surface, an inner peripheral surface or at a radially intermediate location within the radial extend of the tubular member.

The tubular member extends across 360°, and the ring member may also extend across 360°.

Alternatively the tubular member may extend through 360° and the ring member extends through less than 360°. That is, the rings are formed of a plurality of spaced ring portions, such that the ring does not extend across 360°.

A wrap may be placed on an opposed side of the ring member relative to the at least one of the inner and outer peripheral surfaces.

There may also be a plurality of the ring member, with one ring member placed on the outer peripheral surface and a second of the ring members placed on an inner peripheral surface.

There may be a plurality of ring members spaced along an axial length of the tubular member. An axial distance along a central axis of the tubular member is defined between each of the plurality of rings. The axial distance may be uniform across an axial length of the tubular member. Alternatively, an axial distance between adjacent ones of the rings along an axial length of the tubular member may be non-uniform.

The ring member may be at least part circular in cross-section. Alternatively, the ring member may be non-circular in cross-section. The ring member may be a part circular cross-section.

A method of forming a drive shaft could be said to include the steps of forming a tubular member extending along an axis, and having an inner peripheral surface and an outer peripheral surface. Further, the method includes the steps of forming at least one ring member by placing a material on one of the inner peripheral surface and outer peripheral surface, and heating the material. Radial pressure is applied to the material in a sequentially moved fashion. The material is adhered to the one of inner and outer peripheral surface.

A method of forming a drive shaft could also be said as providing the steps of forming a tubular member extending along an axis, and having an inner peripheral surface and an outer peripheral surface. A ring portion in this format on at least one of the inner and outer peripheral surfaces by placing a material on the at least one of the inner and outer peripheral surfaces, applying a roller to the material to adhere the material to the at least one of the inner and outer peripheral surfaces while applying heat to the material.

While the automated fiber placement is the preferred method, various other methods may be utilized. As an example, when the tubular member is a composite, the composite tube could be formed as a continuous element or assembly of segments. The rings may be formed separate from the tube, rather than being formed on the tube. The additional wraps may be attached utilizing automated fiber placement about the rings or can be attached by other methods.

The ring member and tubular member can be secured together by solidifying when the thermoplastic is utilized for both the tube and the rings. In addition, welding can be utilized if thermoplastic is utilized for both the tube and the rings. If a thermoset is used, the ring can be cured onto the tube. Further, the materials can be pre-cured or partially-cured. In addition, radial fasteners, glue or any combination of the various attachment methods disclosed above may be utilized.

It could also be said that this disclosure provides a drive shaft with a tubular member extending between axial ends and being hollow. The tubular member is formed of a thermoplastic matrix with embedded fibers. There is a ring on the tubular member. The ring may be on an outer peripheral portion as shown in some Figures, on an inner peripheral portion, as shown in other Figures, or intermediate the inner and outer peripheral portions, shown in yet other Figures. Further, there may be a plurality of rings.

To the extent these teachings extend to a drive shaft with a metallic tubular member, the metallic tubular member could be formed of a continuous element or an assembly of segments. The ring member can be formed separately. The rings can be assembled with the tube and the rings with or without extra wraps. Welding can be utilized if the ring is also metallic. If the rings are thermoplastic, they can be solidified onto the tubular member. If the ring is thermoset, it can be cured, pre-cured, or partially cured and then placed onto the metallic tubular member. Again, radial fasteners, adhesives, or any combination of the above may be utilized.

It should be understood across these embodiments that the wraps are optional and the ring may stand alone. The rings can be formed of a composite and the wraps may be formed of a composite. Alternatively, the rings may be metallic or the wraps may be formed of a metallic material. In addition, while composite shaft are the main focus of this disclosure, many of the structural combinations disclosed here would benefit metallic shafts. Any combination of composite and material shafts/rings/wraps may come within the scope of this disclosure.

Several embodiments are disclosed above. A worker of ordinary skill in this art would recognize that certain modifications would come within the scope of this disclosure. For that reason, the following claims should be studied to determine the true scope and content of this disclosure.

The invention claimed is:

1. A drive shaft comprising:
   a tubular member extending between axial ends and being hollow, said tubular member formed of a thermoplastic matrix with embedded fibers;
   at least one ring member secured radially of said tubular member; and
   wherein a bending stiffness of the at least one ring member in a hoop direction is at least twice as high as a bending stiffness of said tubular member in the hoop direction given the same width as said ring member.

2. The drive shaft as set forth in claim 1, wherein said tubular member extends across 360° in the circumferential direction, and said ring member also extends across 360° in the circumferential direction.

3. The drive shaft as set forth in claim 1, wherein said tubular member extends across 360° in the circumferential direction and said ring member includes a plurality of spaced ring portions, such that said ring member does not extend across 360° in the circumferential direction.

4. The drive shaft as set forth in claim 1, wherein a wrap is placed on an opposed side of said ring member relative to at least one of an inner and outer peripheral surface of said tubular member.

5. The drive shaft as set forth in claim 1, wherein there are a pair of said ring members, with one of said pair of said ring members placed on an outer peripheral surface of said tubular member and a second of said rings placed on an inner peripheral surface of said tubular member.

6. The drive shaft as set forth in claim 1, wherein there are a plurality of ring members, with at least one of the plurality of ring members placed within a radial extent of said tubular member, and others of said plurality of ring members being placed on at least one of an inner peripheral surface and an outer peripheral surface of said tubular member.

7. The drive shaft as set forth in claim 1, wherein there are a plurality of ring members spaced along an axial length of said tubular member, and an axial distance along a central axis of said tubular member is defined between each of said plurality of ring members and said axial distance is uniform across an axial length of said tubular member.

8. The drive shaft as set forth in claim 1, wherein there are a plurality of ring members spaced along an axial length of said tubular member, and an axial distance is defined along a control axis of said tubular member between adjacent ones of said ring members and said axial distances are not uniform.

9. The drive shaft as set forth in claim 1, wherein said ring member is generally rectangular in cross-section.

10. The drive shaft as set forth in claim 1, wherein said ring member is non-circular in cross-section.

11. The drive shaft as set forth in claim 1, wherein said ring member has a part circular cross-section.

12. The drive shaft as set forth in claim 1, wherein said ring member has one of a generally L-shape in cross-section or a generally I-shape in cross-section.

13. The drive shaft as set forth in claim 1, wherein said ring member is formed of either of a thermoplastic matrix with embedded fibers or a metal material or their combination.

14. The drive shaft as set forth in claim 1, wherein said ring member is centered about a central axis of said tubular member.

15. The drive shaft as set forth in claim 1, wherein said ring member is centered on an axis which is non-parallel to a central axis of said tubular member.

16. The drive shaft as set forth in claim 1, wherein there is a plurality of said ring members each having a central axis which is non-parallel to said central axis of said tubular member, and at least one said central axis of at least one of said plurality of ring members extending in an opposed direction relative to said central axis of at least another of said plurality of said ring members.

* * * * *